United States Patent
Nader et al.

(10) Patent No.: US 12,342,190 B2
(45) Date of Patent: Jun. 24, 2025

(54) SYSTEMS AND METHODS FOR MONITORING AND EFFICIENTLY TESTING NETWORK RESOURCE AVAILABILITY AND CONFIGURATION FOR PUBLIC WARNING SYSTEMS

(71) Applicant: Telefonaktiebolaget LM Ericsson (publ), Stockholm (SE)

(72) Inventors: Ali Nader, Malmö (SE); Gertie Alsenmyr, Vallentuna (SE); Maria Hultström, Stockholm (SE); Carin Omurcali, Solna (SE); Angelo Centonza, Torrenueva Costa (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 346 days.

(21) Appl. No.: 17/909,587

(22) PCT Filed: Mar. 30, 2021

(86) PCT No.: PCT/EP2021/058333
§ 371 (c)(1),
(2) Date: Sep. 6, 2022

(87) PCT Pub. No.: WO2021/198277
PCT Pub. Date: Oct. 7, 2021

(65) Prior Publication Data
US 2023/0112994 A1    Apr. 13, 2023

Related U.S. Application Data

(60) Provisional application No. 63/002,746, filed on Mar. 31, 2020.

(51) Int. Cl.
*H04W 24/06*    (2009.01)
*H04W 4/90*     (2018.01)

(52) U.S. Cl.
CPC .......... *H04W 24/06* (2013.01); *H04W 4/90* (2018.02)

(58) Field of Classification Search
CPC ................ H04W 24/06; H04W 4/90
(Continued)

(56) References Cited

U.S. PATENT DOCUMENTS

| | | | | |
|---|---|---|---|---|
| 8,064,898 B2 * | 11/2011 | Carnall | .................. | H04L 63/30 |
| | | | | 340/528 |
| 2004/0067733 A1 * | 4/2004 | Cook | ...................... | G08B 3/10 |
| | | | | 455/3.06 |

(Continued)

OTHER PUBLICATIONS

PCT International Search Report and Written Opinion mailed Sep. 1, 2021 for International Application No. PCT/EP2021/058333, 18 pages.

(Continued)

*Primary Examiner* — Maria El-Zoobi
(74) *Attorney, Agent, or Firm* — Sage Patent Group

(57) ABSTRACT

A simulated Public Warning System (PWS) message is defined for efficient PWS testing. The simulated PWS message mimics a conventional PWS message, but indicates that it is not to be propagated across an air interface to UEs. However, the simulated PWS message is otherwise propagated through the network as a PWS message. This allows for testing the generation and propagation of PWS messages, without wasting valuable air interface and battery resources. In some embodiments, network nodes may initiate testing by requesting a simulated PWS message. An Access and Mobility management Function (AMF) node in a wireless communication network collects and reports network status to a PWS entity. The AMF node ascertains the functionality of network functions, nodes, and interfaces to which it is connected, independently from receiving (Continued)

reports of such functionality, and an indication of any detected fault or failure is sent to the PWS entity.

11 Claims, 6 Drawing Sheets

(58) Field of Classification Search
USPC .................................................... 455/404.1
See application file for complete search history.

(56) References Cited

U.S. PATENT DOCUMENTS

2018/0324571 A1* 11/2018 Buckley ............... H04L 67/565
2019/0110182 A1* 4/2019 Liu ........................ H04W 4/06
2022/0279477 A1* 9/2022 Li ......................... H04W 68/00

OTHER PUBLICATIONS

3GPP, Technical Specification Group Core Network and Terminals, Technical Realization of Cell Broadcast Service (CBS) (Release 16), 3GPP TS 23.041 V16.3.0 (Mar. 2020), Valbonne, France, 100 pages.
Nokia et al., "Pseudo-CR on Supporting PWS in 5GS via Service Based Interface", 3GPP TR 24.890 v0.2.1, 3GPP TSG-CT WG1 Meeting #105, C1-173503 (was C1-173073), Aug. 21-25, 2017, Krakow, Poland, 5 pages.

* cited by examiner

SYSTEMS AND METHODS FOR MONITORING AND EFFICIENTLY TESTING NETWORK RESOURCE AVAILABILITY AND CONFIGURATION FOR PUBLIC WARNING SYSTEMS

CROSS-REFERENCE TO RELATED APPLICATIONS

This application is a 35 U.S.C. § 371 national stage application for International Application No. PCT/EP2021/058333, entitled "SYSTEMS AND METHODS FOR MONITORING AND EFFICIENTLY TESTING NETWORK RESOURCE AVAILABILITY AND CONFIGURATION FOR PUBLIC WARNING SYSTEMS", filed on Mar. 30, 2021, which claims priority to US provisional Application no. 63/002,746 entitled "SYSTEMS AND METHODS FOR MONITORING AND EFFICIENTLY TESTING NETWORK RESOURCE AVAILABILITY AND CONFIGURATION FOR PUBLIC WARNING SYSTEMS" filed on Mar. 31, 2020, assigned to the assignee hereof, and expressly incorporated herein by reference.

FIELD OF INVENTION

The present invention relates generally to wireless communication networks, and in particular to systems and methods for improving public warning systems.

BACKGROUND

Wireless communication networks are ubiquitous in many parts of the world. In March 2020, an estimated 3.5 billion people (45% of the population) owned a cellphone, and an estimated 4.8 billion (62% of the population) owned a smartphone. In the United States, penetration is even greater, with 95% of the population owning a cellphone, and 77% a smartphone. These devices, as well as others accessing the networks, such as laptop or tablet computers, dongles, and embedded circuits performing Machine Type Communications (MTC) are collectively referred to herein as User Equipment (UE). Given the vast, and growing, popularity of UEs, the wireless network has become a major channel by which authorities issue public warnings of emergencies such as fires, flash floods, and other weather events; evacuations; terrorist alerts; and the like.

The fifth generation wireless network (5G), called New Radio (NR) and specified in Release 15 of technical standards promulgated by the Third Generation Partnership Project (3GPP), provides two types of Public Warning System (PWS) messaging. The PWS messages are broadcast in system information to UEs in RRC states IDLE, INACTIVE, or CONNECTED.

The Earthquake and Tsunami Warning System (ETWS) is primarily used in Japan. It consists of two types of warning messages. A "Primary Notification" is first sent to indicate the type of the warning. Five different warning types are currently defined (see 3GPP TS 23.041, section 9.3.24). Then a "Secondary Notification" may be sent, typically after around 20 seconds, with the full disaster information.

Wireless Emergency Alerts (WEA), formerly known as Commercial Mobile Alert System (CMAS) in the US, incorporate the European Public Warning System (EU-Alert) and various other systems used around the world. In addition to warning messages, when Device-Based Geo-Fencing (DBGF) is used, a WEA Handset Action Message (WHAM) may be sent. The purpose of DBGF is to send geographical coordinates to the UE, so that when a UE is inside the specified area, the end user will be alerted. The WHAM message is used as a reminder for the UE to recheck if it has entered an area for which it previously received a warning message. For WEA/CMAS, many different messages can be broadcast concurrently.

3GPP defines a variety of 5G network architectural options for PWS, which are specified in 3GPP TS 23.041, "Technical realization of Cell Broadcast Service (CBS)." Representative architectures are depicted in FIGS. 1A, 1B, and 1C. These architectures may include one or more of the following network functions, each of which may be implemented in a separate node, distributed across two or more network nodes, or implemented along with other network functions in a single node:

CBCF or CBC/PWS-IWF: Cell Broadcast Centre Function (when part of the wireless network) or Cell Broadcast Centre (when external to the wireless network) Public Warning System—Inter Working Function.

AMF: Access and Mobility management Function.

RAN: Radio Access Network.

gNB: The base station in 5G (known as eNB in 4G, or LTE), which may, as depicted in FIG. 2, consist of a Central Unit (nNB-CU) and a Distributed Unit (gNB-DU). The gNB-CU and gNB-DU are connected using the F1 interface, which is specified in 3GPP TS 38.473. This document describes procedures for interface establishment, unlocking cells, configuration updates, paging, Public Warning Systems (PWS), and the like.

These network functions (or nodes) may communicate via various named interfaces, such as:

Uu: The air interface (RF radio link) between a gNB of a RAN and a UE.

N2: The control plane interface between a RAN (or non-3GPP WLAN) and the core network.

N50: The reference point between AMF and the CBCF.

Namf: Service based interface between the AMF and other network functions (e., AMF, SMF, PCF, UDM, SMSF, LMF, GMLC, CBCF, PWS-IWF).

Embodiments of the present invention are described with reference to the control-plane interaction and interface between the network nodes or entities gNB-CU, gNB-DU, the AMF, and the PWS entity. The PWS entity may be a CBCF, a PWS-IWF, or a PWS-CBC, depending on the architecture. Communication may be over the N50 or Namf interface. In this context, the terms N2, NG Control Plane Interface (NG-C), and NG Application Protocol (NGAP) may be used interchangeably, as they refer to the same interface or application running on it. The same applies to the terms F1, F1-C, and F1AP. Furthermore, for the sake of simplicity, the term "CBCF" may be used hereafter referring to the PWS entity in the network, irrespective of the particular architecture.

While the background and examples provided in this disclosure refer to the 5G system, it is well known that PWS is used over other systems, such as the 4G Evolved Packet System (EPS). Those of skill in the art may readily apply the systems and methods described herein to other systems where PWS is in use. Accordingly, all terminology (e.g., "gNB") should be considered as referencing the associated network functionality, and is not limited to any specific implementation or generation. Similarly, specific Message Identifiers discussed herein are not limited to any particular specification or release of a technical standard—rather, they should be considered as indicative of the message functionality.

The primary mechanisms used by PWS consist of the procedures and messages listed below, which are used between different nodes in the network, from the CBCS/PWS Inter-Working Function (IWF) to the gNB-DU. These procedures and messages can take different names over different interfaces. Below the procedures and messages used over the NG interface are used as a non-limiting example.

Write-Replace Warning Response: this indicates whether the public warning message broadcast triggered via a Write-Replace Warning Request was successful, per coverage area.

PWS Cancel Request/Response: these messages are used to indicate to the RAN that a given broadcast message should be stopped (cancelled). The RAN replies with a response to confirm cancellation.

PWS RESTART INDICATION: This message is sent by the NG-RAN node to inform the AMF that PWS information for some or all cells of the NG-RAN node are available for reloading from the CBC, if needed.

PWS FAILURE INDICATION: This message is sent by the NG-RAN node to inform the AMF that ongoing PWS operation for one or more cells of the NG-RAN node has failed.

Two PWS use cases are described in detail, for the sake of a clear understanding of the systems and methods described herein: First, transmission of a public warning message to the UEs over Uu. Second, failure and restart handling internally within the network (between RAN, AMF, and the PWS entities CBCF or PWS-IWF/CBC).

The first use case (transmission of the messages to the UEs) is illustrated in FIG. 3. The process is initiated by the PWS entity via a WRITE-REPLACE-WARNING-REQUEST-NG-RAN or WRITE-REPLACE-WARNING-REQUEST message (depending on chosen architecture) over the N50/Namf interface. This message is in turn reflected with the same or similar names over the interfaces N2 and F1, with some content differences. Eventually, over the Uu interface, the network will broadcast System Information Blocks (SIBs) from which the UEs in a cell receive the PWS message.

The PWS message types are identified through a Message Identifier parameter. Once the UE has received the message, it will display the message for the end-user, unless the Message Identifier indicates that the intention of the message is testing. For example, if the UE receives a PWS message with Message Identifier value set to 4355 (test message for ETWS), it then silently discards the message without displaying the contents for the end user (see 3GPP TS 23.041, for full range of standardized Message Identifiers).

This method of testing raises a difficult tradeoff between early problem detection and network/UE resource and energy wastage. Because the test messages are delivered all the way to the UE (although they do not notify the user), they consume limited air interface resources. The more often such tests are run, and the larger the geographical area in which the tests are conducted, the more the network resources are consumed. Furthermore, the high priority of PWS messages means that all other network activity in the intended area is preempted. Similarly, processing or other activity at the UE is preempted as the UE processes the PWS test messages, although the user remains unaware of the cause of the interruption. Hence, robust testing results in the interruption of other ongoing services, extensive battery consumption, and potentially presenting unnecessary information to the end user. Conversely, the less often and/or smaller geographical area in which such tests are carried out, the larger the risk of undetected faults in the network. Generally, these tests are intended to be carried out with a frequency on the order of monthly. However, in some cases the CBCF carries out such tests in wide geographical areas on an hourly basis, to err on the side of safety and being fully prepared for a potential disaster. Such extensive PWS testing is extremely wasteful of both network and UE resources, and also consumes excess energy, which in the case of the UEs reduces battery life.

Short of the resource-wasteful testing describe above, the existing standardized procedures currently include no efficient way to sanity check the network resources or configuration before an actual disaster takes place, when the PWS is initiated in the network. Typically, a potential fault in any of the network nodes is detected once the actual transmission takes place. Obviously, it is not optimal to troubleshoot network related issues when such vital information needs to reach the population of the intended area. Hence, this reactive way of troubleshooting issues related to the PWS system compromises the robustness and availability of PWS services.

The second use case (related to failure and restart handling) is illustrated in FIG. 4. The process is initiated by the RAN, which detects a fault or failure, or the cure of one. When the AMF receives these messages from the RAN, it forwards them to the CBCF in the network. Thereby, upon receiving a FAILURE-INDICATION, the CBCF is informed that ongoing PWS operation in one or more, or all, of the cells served by the RAN node has failed. Similarly, upon receiving a RESTART_INDICATION, the CBCF is informed that one or more, or all, of the cells of the RAN node are operational again and ready for being reloaded by PWS messages.

Common to the failure/restart procedures used in the event of failure in RAN, is that there is currently no procedure for the AMF itself to initiate and inform the CBCF about RAN sub-system failures, or link unavailability toward the RAN. The currently standardized procedures are based on the RAN initiating and informing the AMF about failures and/or recovery (restart), which are in turn forwarded to the CBCF. However, there might be cases of failure in which the RAN itself cannot inform the AMF—e.g., upon N2 breakage/failure, or upon gNB-CU failure (e.g., crash). As a result, the CBCF may completely be unaware of failures in the provision of PWS messages. Furthermore, even in cases that the CBCF receives the failure indication, the granularity of the information in the indication is too low to pinpoint where the failure resides, and therefore it is not easy to troubleshoot. As seen in FIG. 4, the CBCF receives the failure indication, but does not know which node initiated the failure. Especially in a multi-vendor scenario, it is vital during a disaster scenario that the problem node is identified as soon as possible, and personnel with proper node knowledge are notified to remedy the issue.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a simulated PWS message is defined. The simulated PWS message mimics a PWS message, but indicates that it is not to be propagated across an air interface to UEs. However, the simulated PWS message is otherwise propagated through the network as a PWS message. This allows for testing the generation and propagation of PWS messages, without wasting valuable air interface and battery resources. In some embodiments, network nodes may initiate testing by requesting a simulated PWS message.

According to other embodiments described and claimed herein, an AMF node in a wireless communication network collects and reports network status to a PWS entity. The AMF node ascertains the functionality of network functions, nodes, and interfaces to which it is connected, and an indication of any detected fault or failure is sent to the PWS entity. This allows for discovery of network faults or failures which may adversely impact PWS performance, but which cannot be found (or can only be reported with insufficient specificity) by prior art methods.

One embodiment relates to a method, performed by a Public Warning System (PWS) entity within or connected to a wireless communication network, of testing PWS functionality in the network. A simulated PWS message, that indicates the message is not to be propagated across an air interface to User Equipment (UE), but otherwise propagated through the network as a PWS message, is generated. The simulated PWS message is sent into the network.

Another embodiment relates to a node, within or connected to a wireless communication network, and fully or partially implementing Public Warning System (PWS) functionality. The node includes one or more communication interfaces and processing circuitry operatively connected to the communication interfaces. The processing circuitry is configured to generate a simulated PWS message that indicates the message is not to be propagated across an air interface to User Equipment (UE), but otherwise propagated through the network as a PWS message; and send the simulated PWS message into the network.

Yet another embodiment relates to a method, performed by an Access and Mobility management Function (AMF) in a wireless communication network, of ascertaining and reporting network status to a Public Warning System (PWS) entity. The functionality of network functions, nodes, and interfaces to which it is connected is ascertained, independently from receiving reports of such functionality. Upon detecting a fault or failure of a network function, node, or interface, independently from receiving notification of such a fault or failure, an indication of the fault or failure is sent to the PWS entity.

Still another embodiment relates to a network node, fully or partially implementing an Access and Mobility management Function (AMF) in a wireless communication network, and operative to ascertain and report network status to a Public Warning System (PWS) entity. The network node includes one or more communication interfaces and processing circuitry operatively connected to the communication interfaces. The processing circuitry is configured to ascertain the functionality of network functions, nodes, and interfaces to which the network node is connected, independently from receiving reports of such functionality; and upon detecting a fault or failure of a network function, node, or interface, independently from receiving notification of such a fault or failure, send an indication of the fault or failure to the PWS entity.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As discussed above, it is desired for an emergency service provider to have up-to-date status of network sanity, resource availability, and message content sanity well ahead of a time of actual disaster. However, running a full-blown PWS test with high periodicity (for example, on the order of hourly) is quite expensive in wasted network resources and power consumption. According to one embodiment of the present invention, which is directed to the first use case described above (network testing), the PWS entity of the 3GPP network (e.g., CBCF) or external to the network (e.g., CBE) may initiate a "dry-run" or "test-run" of propagating PWS message(s), but no actual transmission of the PWS messages occurs over the air interface Uu. As used herein, this is referred to as a "simulated PWS message," or a "PWS simulation." Based on the simulated PWS message, the network nodes act as if the message were going to be broadcast, and perform sanity checks of the received message, their configurations, the availability of resources, and the like, without actual transmission over the air. Potential faults are reported back through WRITE-REPLACE WARNING REPONSE/PWS FAILURE.

Figure 1A:
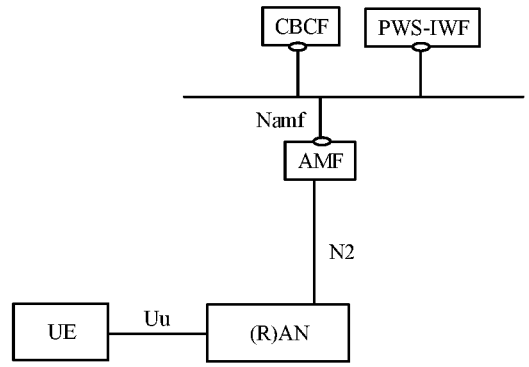
FIGS. 1A-1C are block diagrams of various wireless communication network architectures for implementing a Public Warning System (PWS).
Figure 1B:
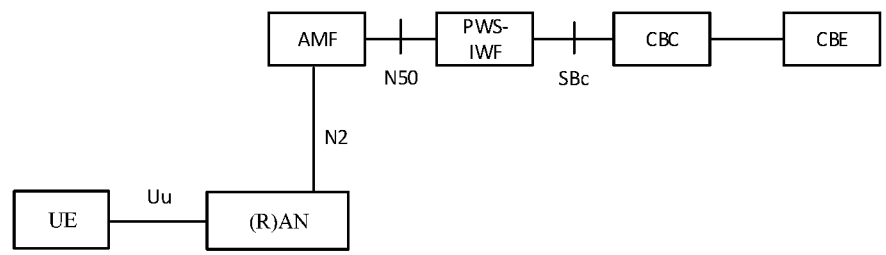
Figure 1C:
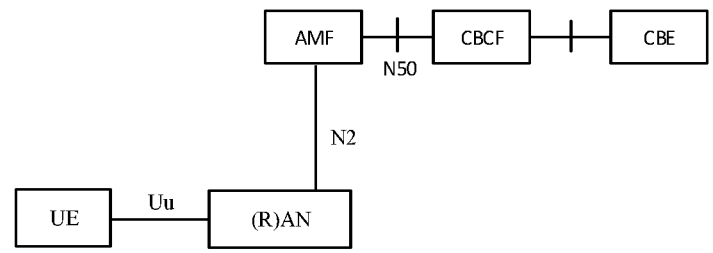
Figure 2:
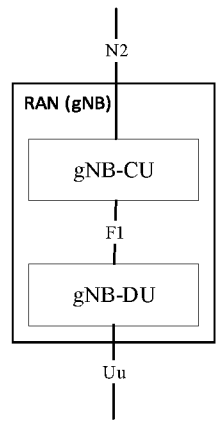
FIG. 2 is a block diagram of Central and Distributed Units of a Radio Access Network.
Figure 3:
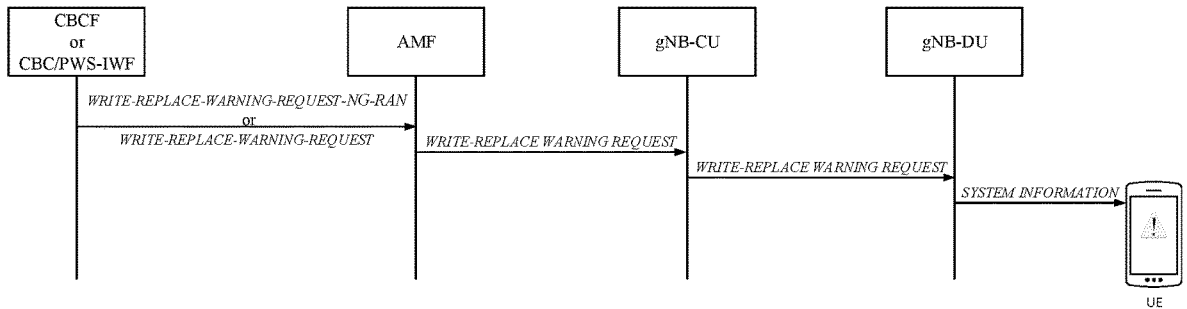
FIG. 3 is a message flow diagram of a PWS message propagating through a wireless communication network from the generating entity to a UE.
Figure 4:
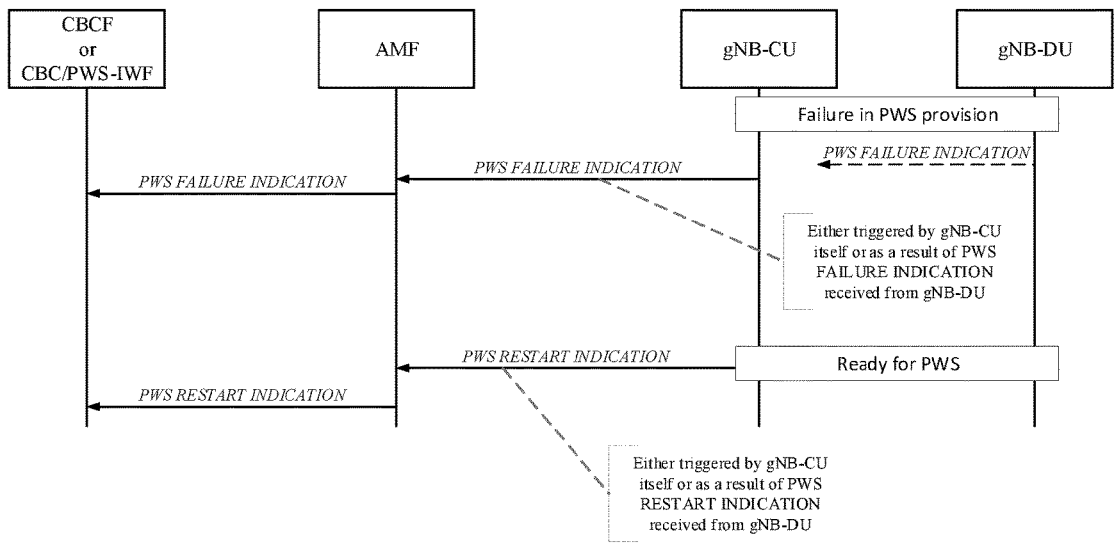
FIG. 4 is a message flow diagram of a PWS failure or restart message propagating through a wireless communication network from a RAN node to the PWS generating entity.
Figure 5:
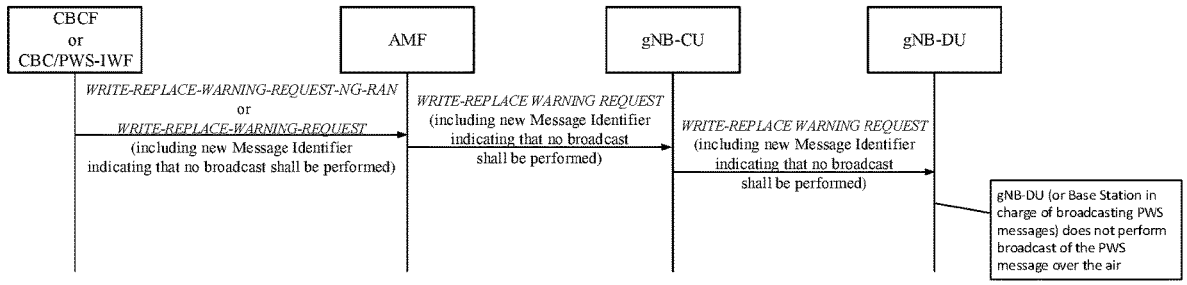
FIG. 5 is a message flow diagram of a dry-run PWS test message propagating through a wireless communication network from the PWS generating entity to a RAN, that is not broadcast to UEs.

In one aspect of the present invention such a simulated PWS message is realized by a new standardized and/or reserved Message Identifier. FIG. 5 demonstrates the call flow.

In another aspect, such a simulated PWS message is realized by a new information element (e.g., a flag or the like) in the existing WRITE-REPLACE request messages. In yet another related aspect, this information element (IE) may only be applicable to some specific Message Identifiers (e.g., test messages) and ignored otherwise. This new IE indicates to the node in charge of broadcasting PWS messages over the air that the PWS message identified by the Message Identifier with the new IE included shall not be broadcast over the air interface. Alternatively, the IE may indicate to the receiving node that a number of tasks are performed, for example:

Check that coverage for the area for which the message is assumed to be broadcast is active. For example, if a list of cells defines the broadcast area for the PWS message, this would translate into checking that these cells are active and in service. Check that resources needed to deliver and broadcast the message are available.

Note that these resources may not be limited to air interface resources but also to, e.g., transport resources needed to forward the Write Replace Warning Request to the opportune network node.

Check that the components hosting processes in charge of delivering and broadcasting the PWS message are correctly functioning and able to correctly process and deliver the message. For example, if a gNB-DU is connected to multiple Remote Radio Units (RRU), the IE could indicate to the gNB-DU to check that all the RRUs involved in the delivery of the PWS message are correctly operating and able to deliver the message.

One way to achieve encoding of the new IE in existing standardized messages is shown below with the example of the NGAP protocol:

9.2.8.1 Write-Replace Warning Request

This message is sent by the AMF to request the start or overwrite of the broadcast of a warning message.

Direction: AMF→NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Message Identifier | M | | 9.3.1.35 | | YES | reject |
| Serial Number | M | | 9.3.1.36 | | YES | reject |
| Warning Area List | O | | 9.3.1.37 | | YES | ignore |
| Repetition Period | M | | 9.3.1.49 | | YES | reject |
| Number of Broadcasts Requested | M | | 9.3.1.38 | | YES | reject |
| Warning Type | O | | 9.3.1.39 | | YES | ignore |
| Warning Security Information | O | | 9.3.1.40 | | YES | ignore |
| Data Coding Scheme | O | | 9.3.1.41 | | YES | ignore |
| Warning Message Contents | O | | 9.3.1.42 | | YES | ignore |
| Concurrent Warning Message Indicator | O | | 9.3.1.46 | | YES | reject |
| Warning Area Coordinates | O | | 9.3.1.112 | | YES | ignore |
| DoNotBroadcast | O | | | Indicates that the PWS message identified by Message Identifier and Serial Number should not be broadcast over the air | YES | reject |

The table above is copied from 3GPP TS 38.413, and lists IEs for the Write Replace Warning Message. The last element, DoNotBroadcast, has been added as one non-limiting example the inventive IE.

Furthermore, according to embodiments of the present invention, it is possible for a network node to indicate a potential need for PWS testing. The node may indicate such need based on a configuration or resource availability change that may be relevant to PWS provision, for example, a change in configuration related to cell bandwidth. Or as another example, a change in configuration related to broadcast functionality (e.g., SIB periodicity or the like). Alternately, a new/redundant node added to the network may initiate a sanity check is desirable. Such indication from the network node may be realized either through extension of existing messages, or by introducing new explicit messages targeted to this purpose. Based on such indication from various network nodes, the PWS entity may carry out a PWS transmission test in the specific area of the network, rather than broadly across the whole network or significant parts of it. Furthermore, the rate of testing may be reduced, since extra testing is carried out when necessary and appropriate, and the rate of other potential background testing can be reduced.

Figure 6:
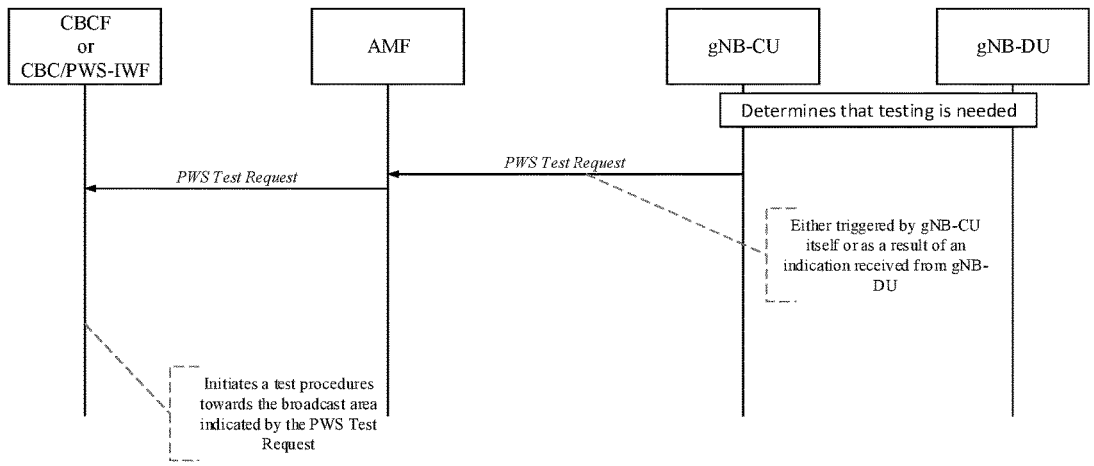
FIG. 6 is a message flow diagram of an AMF node notifying a PWS generating entity of a discovered network fault, and requesting a PWS test.

FIG. 6 depicts this method in one embodiment. Note that the test request generated towards the CBCF and/or CBC/PWS-IWF may identify a broadcast area towards which the test shall be performed.

In one aspect, the indicating network node, may further indicate or recommend the type of testing that should be carried out by the PWS entity. For example, it may indicate whether the testing should include transmission over the air (as per current specifications) or according to the PWS simulation procedure described herein. The request may be directed to the PWS entity (e.g., CBCF) or any other entity—including one external to the network that may initiate the PWS simulation.

Figure 7:
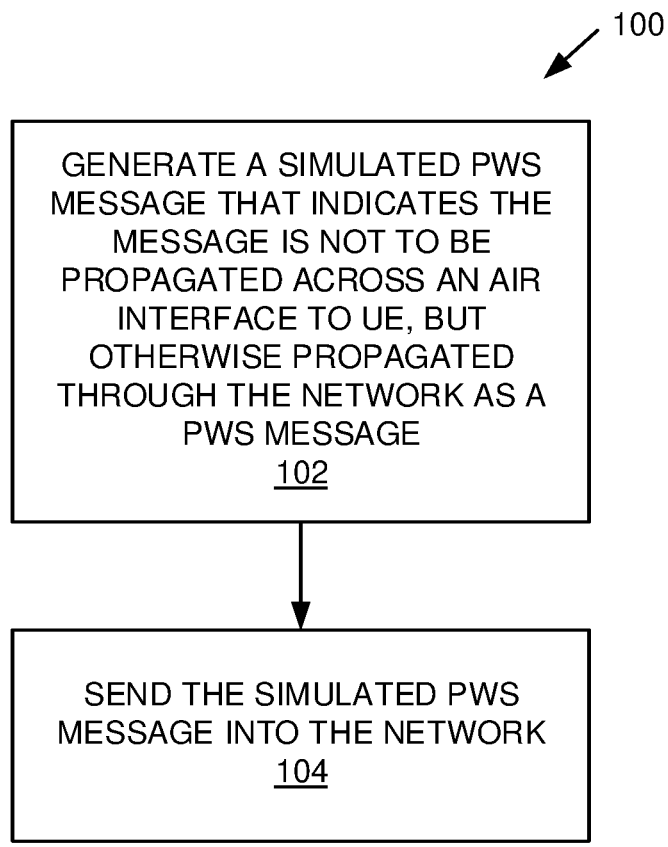
FIG. 7 is a flow diagram of a method of testing PWS functionality in a network.

FIG. 7 depicts the steps of a method 100, performed by a PWS entity within or connected to a wireless communication network, of testing PWS functionality in the network. The method includes generating a simulated PWS message that indicates the message is not to be propagated across an air interface to UE, but otherwise propagated through the network as a PWS message (block 102). The method then includes sending the simulated PWS message into the network (block 104).

Figure 8:
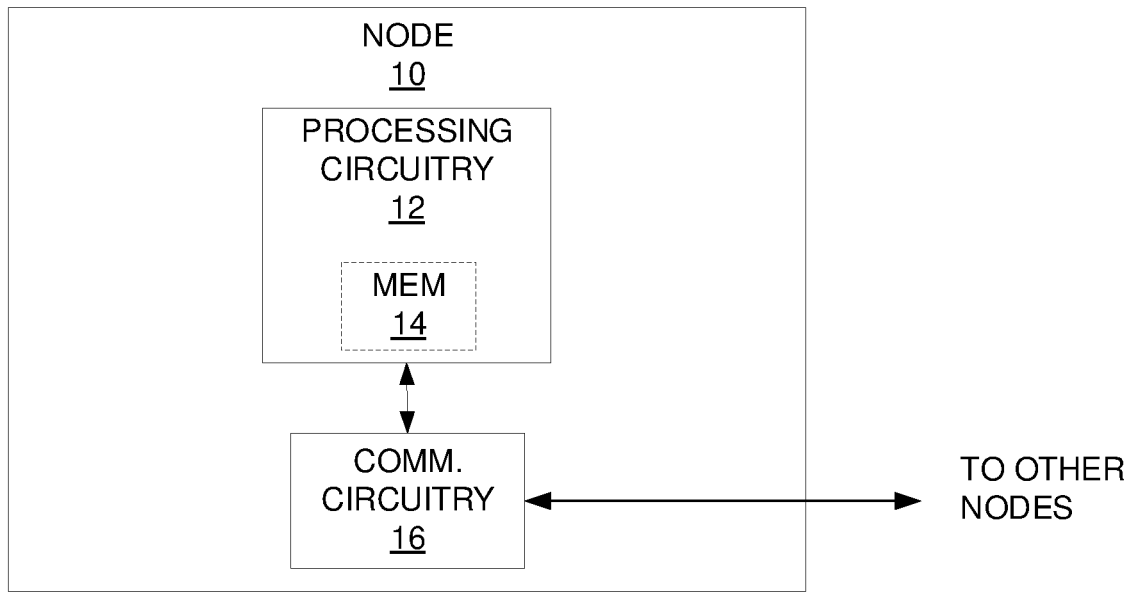
FIG. 8 is a block diagram of a network node.

FIG. 8 depicts a node 10, which for example may comprise a PWS entity, such as a CBCF (within the network) or a CBC/PWS-IWF (external to the network). The PWS entity 10 includes processing circuitry 12, memory 14 (which may be internal to the processing circuitry 12 as depicted, or may be separate), and communication circuitry 16. The memory 14 is configured to store, and the processing circuitry 12 is configured to execute, software instructions that cause the node 10 to implement the method 100 of testing PWS functionality in the network.

The processing circuitry 12 may comprise any sequential state machine operative to execute machine instructions stored as machine-readable computer programs in memory 14, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above. The memory 14 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The communication circuitry 16 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

According to one embodiment of the present invention, which is directed to the second use case described above (failure/restart reporting), the AMF node supervises the connection and/or sanity of underlying RAN node(s) (e.g., N2 connection and/or sanity of gNB-CU(s)). The AMF may detect failures in N2 such as physical link breakage, or logical error over the NGAP. Furthermore, even though the interfaces are available, the AMF may detect that the serving gNB-CU is not responding or behaving properly (e.g., not responding to requests as it should, extensive delays in handling procedures, or the like). Based on such failure detections, the AMF may ascertain that the RAN is not able to serve potential PWS requests. As a result, the AMF node itself initiates failure reporting to the CBCF.

Such failures are detected while the PWS service is currently assumed to be provided in the network. That is, at the time of PWS service start (initiated by CBCF) the underlying subsystem was functional and CBCF believes that the service is ongoing while the AMF detects the failures. In one aspect of the present invention, the AMF initiates the failure indication towards the CBCF while PWS is believed to be ongoing, or active.

Alternatively, such failure may be detected by AMF while no PWS service is ongoing in the network. As such, in one aspect of the present invention, at the point in time when CBCF initiates PWS, AMF notifies the CBCF that there is a failure; either with a FAILURE INDICATION message or through extension of response messages (WRITE-REPLACE-WARNING-CONFIRM/INDICATION) to the PWS Write Replace Request.

The failure message generated by the AMF towards the CBCF (or equivalent node in charge of starting PWS services) may include information concerning one or more of the following:

A list of Tracking Area Codes (TAC) and/or Tracking Area Indications (TAI) subject to outage due to detected failure.

A list of Cells subject to outage due to detected failure.

A list of identifiers, e.g., NG RAN node IDs, identifying the nodes affected by the failure.

The failure type detected, e.g., link breakage, unexpected node behavior, or unresponsive node (despite NGAP signaling connection working).

In another aspect of the present invention, the RAN was unaware of potential PWS start during outage, while the AMF has such knowledge and could have provided, inter alia, the above failure indications. In this aspect, in case of RAN recovery, the AMF initiates RESTART message towards the CBCF when the underlying nodes/interfaces become available again, enabling the CBCF to reload PWS messages, if still relevant.

In all aspects of the present invention, the messages used for PWS failure/fault indication (whether explicit failure indications, or confirm/response messages) are extended to carry information towards CBCF (or any other node interested in the information) that a failure is within a specific node of the network (e.g., AMF, gNB-CU, gNB-DU) or an interface thereof (e.g., N2 link breakage, F1AP link breakage, or the like) and furthermore include an implicit or explicit identity of the node, from which the specific node location can be derived.

Figure 9:
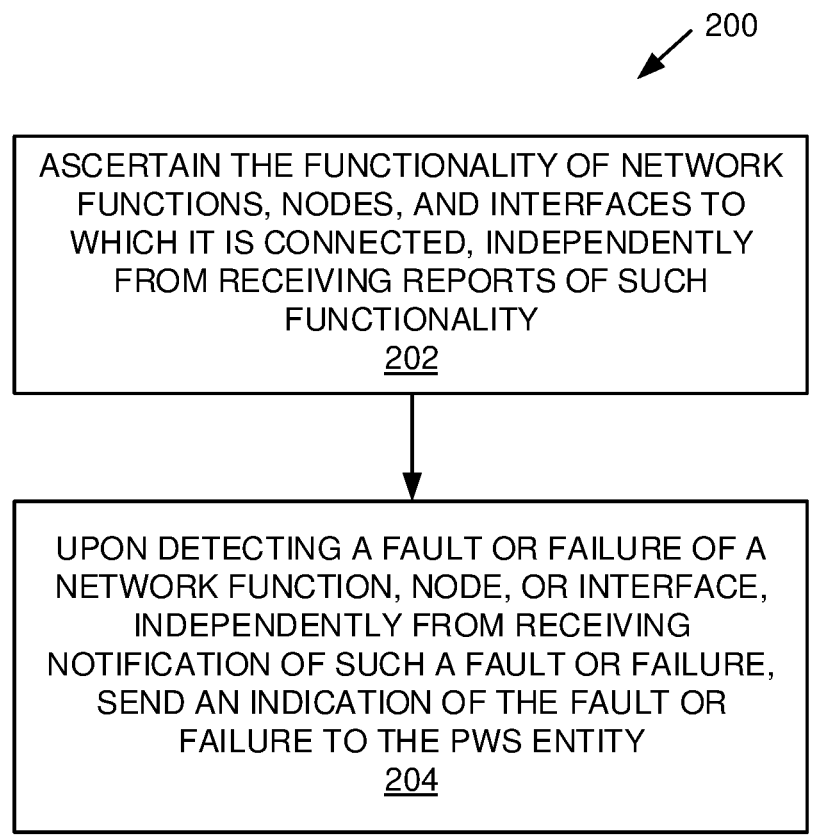
FIG. 9 is a flow diagram of a method of testing PWS functionality in a network.

FIG. 9 depicts the steps of a method 200, performed by an AMF in a wireless communication network, of ascertaining and reporting network status to a PWS entity. The method includes ascertaining the functionality of network functions, nodes, and interfaces to which it is connected, independently from receiving reports of such functionality (block 202). The method then includes, upon detecting a fault or failure of a network function, node, or interface, independently from receiving notification of such a fault or failure, sending an indication of the fault or failure to the PWS entity (block 204).

The node 10 depicted in FIG. 8 may for example comprise a network node implementing an AMF. As described above, the AMF 10 includes processing circuitry 12, memory 14 (which may be internal to the processing circuitry 12 as depicted, or may be separate), and communication circuitry 16. The memory 14 is configured to store, and the processing circuitry 12 is configured to execute, software instructions that cause the network node 10 to implement the method 200 of ascertaining and reporting network status to a PWS entity.

Embodiments of the present invention present numerous advantages over the prior art. The simulated PWS message described herein allows robust testing of network resources used in PWS propagation and delivery, without wasting expensive air interface resources or depleting UE batteries. Various network nodes can request such PWS simulation as appropriate (e.g., upon a change in configuration, capacity, coverage, or the like). The ability of an AMF node to report network faults or failures to the PWS entity improves PWS robustness by exposing network shortcomings that the PWS entity may never see in prior art systems (or which may be reported with insufficient specificity). In short, embodiments of the present invention allow the network to keep track of, and act against, potential failure of network functions, nodes, and interfaces critical to the PWS well ahead of actual disaster, and do so in a non-intrusive and non-wasteful manner.

As used herein, the term "configured to" means set up, organized, adapted, or arranged to operate in a particular way; the term is synonymous with "designed to."

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, performed by a Public Warning System (PWS) entity within or connected to a wireless communication network, of testing PWS functionality in the network, comprising:
    generating a simulated PWS message that indicates the message is not to be propagated across an air interface to a User Equipment (UE), but otherwise propagated through the network as a PWS message; and
    sending the simulated PWS message into the network.

2. The method of claim 1, wherein the simulated PWS message comprises a new standardized Message Identifier.

3. The method of claim 1, wherein the simulated PWS message comprises the PWS message having an Information Element (IE) indicating the message is not to be propagated across the air interface.

4. The method of claim 3, wherein the IE further indicates that a network node should ascertain that coverage for an area over which the message is to be broadcast, is active.

5. The method of claim 4, wherein the area over which the message is to be broadcast is defined by a list of cells, and wherein ascertain that coverage for the area is active comprises ascertaining that the cells on the list are active and in service.

6. The method of claim 3, wherein the IE further indicates that a network node should ascertain that one or more of air interface resources and transport resources needed to forward the PWS message to a base station network node are available.

7. The method of claim 1, further comprising, prior to generating and sending the simulated PWS message:
    receiving from a network node an indication of a need for PWS testing; and
    wherein generating and sending the simulated PWS message is done in response to receiving the indication of the need for PWS testing.

8. The method of claim 7, wherein the indication of the need for PWS testing received from the network node comprises a new standardized Message Identifier.

9. The method of claim 7, wherein the indication of the need for PWS testing received from the network node comprises the PWS message having an Information Element (IE) indicating the need for PWS testing.

10. The method of claim 7, wherein:
    the indication of the need for PWS testing received from the network node identifies a broadcast area towards which PWS testing should be performed; and
    generating the simulated PWS message in response to receiving the indication of the need for PWS testing comprises generating the simulated PWS message to cover only the identified broadcast area.

11. A node, within or connected to a wireless communication network, and fully or partially implementing Public Warning System (PWS) functionality, comprising:
    one or more communication interfaces; and
    processing circuitry operatively connected to the communication interfaces and configured to:
        generate a simulated PWS message that indicates the message is not to be propagated across an air interface to a User Equipment (UE), but otherwise propagated through the network as a PWS message; and
        send the simulated PWS message into the network.

* * * * *